United States Patent [19]

McNeill, II

[11] Patent Number: 4,763,414
[45] Date of Patent: Aug. 16, 1988

[54] DEVICE AND METHOD FOR CORING AND CUTTING OF FRUITS AND VEGETABLES FOR SUBSEQUENT FILLING WITH COMPLEMENTARY FOODS

[76] Inventor: Charles R. McNeill, II, 1684 Kramer St. N.E., Washington, D.C. 20002

[21] Appl. No.: 919,709

[22] Filed: Oct. 16, 1986

[51] Int. Cl.[4] .................. A47J 23/00; A47J 25/00
[52] U.S. Cl. ................................. 30/113.1; 30/301
[58] Field of Search .............. 30/123, 130, 299, 301, 30/316, 342, 113.1, 113.2, 113.3, 142–150

[56] References Cited

U.S. PATENT DOCUMENTS

| | | | |
|---|---|---|---|
| 1,191,608 | 7/1916 | Miner | 30/142 X |
| 1,578,827 | 3/1926 | Holsinger | 30/113.3 |
| 2,257,202 | 9/1941 | Taylor | 30/142 |
| 2,447,301 | 8/1948 | Wright | 30/316 X |
| 2,968,060 | 1/1961 | Eubanks | 30/342 X |

Primary Examiner—Douglas D. Watts
Attorney, Agent, or Firm—William F. Frank

[57] ABSTRACT

The present invention comprises a handle having at least one coring assembly extending outwardly and away from one end of the handle. The coring assembly is a continuous ring of thin, stainless steel having a cross-section of a known geometric shape, a circle in the simplest form. The ring is joined to, or is an extension of, a thin zig-zag band portion which is joined to the handle.

7 Claims, 2 Drawing Sheets

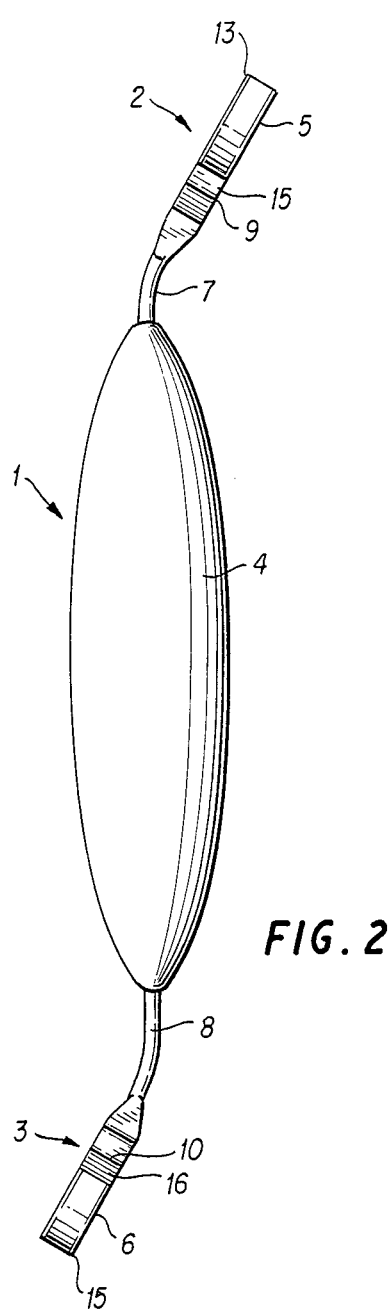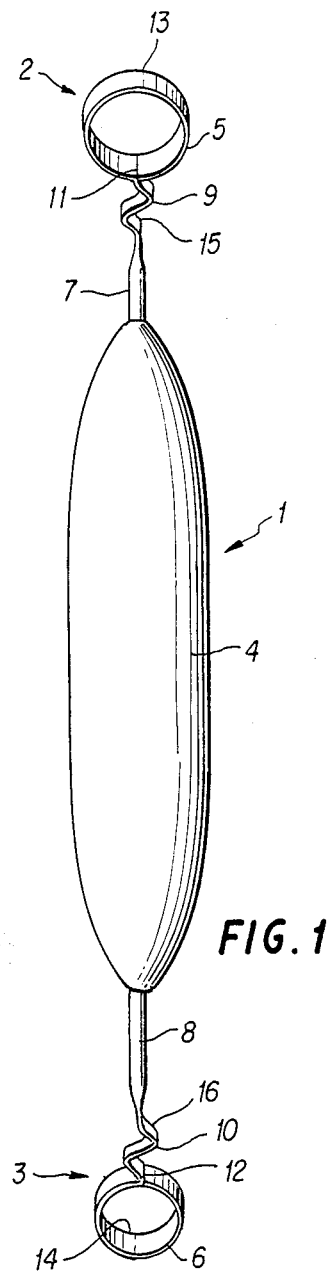

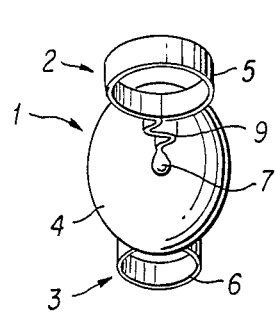
FIG. 3
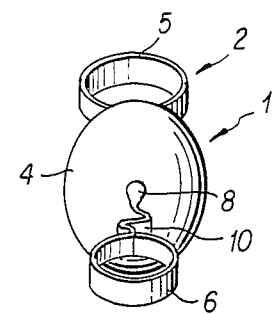
FIG. 4
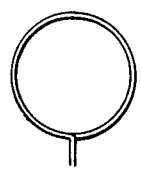 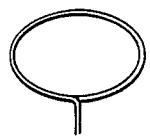 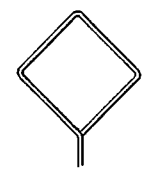
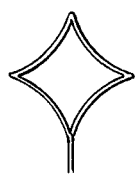 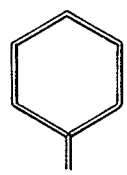 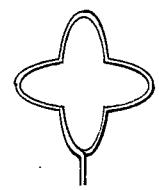
FIG. 5

DEVICE AND METHOD FOR CORING AND CUTTING OF FRUITS AND VEGETABLES FOR SUBSEQUENT FILLING WITH COMPLEMENTARY FOODS

FIELD OF INVENTION

The present invention is in the field of culinary devices for use in the preparation of fruits and vegetables in attractive and diverse presentations. More specifically, the present invention comprises a device of one or more shapes which cores fruits and vegetables in an unheretofore undisclosed manner which permits the presentation of the fruit or vegetable to a diner in an appetizing and unusual form.

BACKGROUND OF THE INVENTION

Culinary artists have continually strived to present their patrons with fruits and vegetables in attractive, unusual and taste-tempting forms. To this end, melon-type fruits have been presented in the form of crenulated boats, filled with such fruits as grapes, melon balls, apple balls and the like. Some vegetables such as radishes and carrots, for example, lend themselves to be presented as curls or petalled forms. Crisp vegetables such as zucchini are frequently presented with serrated edges or cored and filled with a complementary tasting food such as cream cheese.

This device can be categorized with such kitchen and food service cutlery as melon-ballers, melon-cutters, and zucchinicorers; they are used primarily to create a decorative effect rather than to solve a basic food preparation problem.

While the new invention can perform some of the same functions as these commonly-available gadgets, it makes possible to perform at least one feat which none of these gadgets can perform: cutting a cylindrical "core" from the full length of a banana or other elongated fruits and vegetables, regardless of size and degree of curvature.

A zucchini corer or an apple corer is unsuited to this task for two basic reasons: (1) The blades of these devices are much too thick and not nearly sharp enough to make a neat cut in the relatively delicate banana pulp; (2) Their blade and supporting shank structure, being in a straight line and of predetermined length, does not allow for differences in both length and curvature that are characteristic of bananas.

SUMMARY OF THE PRESENT INVENTION

The present invention comprises a handle having at least one coring assembly extending outwardly and away from the handle end. The coring assembly is a continuous ring of thin stainless steel having a cross-section of known geometric shapes, a circle in the simplest form. The ring is joined to, or is an extension of, a thin zig-zag band portion which is joined to the handle.

BRIEF DESCRIPTION OF THE DRAWINGS

The present invention is to be seen in the accompanying drawings which are illustrative of the present invention.

FIG. 1 is a top plan view of the present invention, the rear plan view being substantially identical.

FIG. 2 is a left elevation view of the present invention, the right elevation view being substantially identical.

FIG. 3 is a front end elevation view of the invention as seen in FIG. 1.

FIG. 4 is a rear end elevation view of the invention as seen in FIG. 1.

FIG. 5 is an elevation view of alternative geometrical forms of the coring element of the present invention.

DETAILED DESCRIPTION OF THE INVENTION

The present invention 1 as seen in FIGS. 1–4 comprises a handle portion 4, a first coring assembly 2, and a second coring assembly 3. Coring assembly 2 comprises a stainless steel shaft 7 extending outwardly from one end of handle 4. Shaft 7 is formed into a zig-zag extension 9 which terminates in a stainless steel continuous ring 5 which is permanently joined at juncture 11. The ring 5 and the zig-zag extension 9 are formed to be of a knife-edge-like thinness as to negate the formation of a cutting edge thereon. Coring assembly 3 is formed in a manner identical to coring assembly 2 but of a smaller diameter, with shaft 8 extending outwardly off the handle 4, having a zig-zag portion 10 terminating in ring 6, zig-zag portion 10 being substantially identical to zig-zag portion 9, zig-zag portion 10 and ring 6 having the identical properties of zig-zag portion 9 and ring 5.

It is to be noted that shafts 7 and 8 are angled with respect to the longitudinal axis of handle 4. In the use of the present invention it has been discovered that the angling of the shafts 7 and 8 facilitates the centralized coring of the fruit or vegetable because of the natural relationship of a hand and arm holding an implement to the fruit or vegetable. For this reason proper use of the present invention is to grasp the handle so that whichever coring ring is to be used is angled toward the fruit or vegetable.

The development of zig-zag portions 9 and 10 in lieu of the conventional straight knife-like form has been found to prevent material inserted into the core from spreading into the slits formed by prior known corers and spreading the slits so that the core-filling substance may rise to the surface of the fruit or vegetable used. It is believed that the resistance of the zig-zag slit to open up when a filling is inserted into the core is due to the increased surface area of such a slit which helps to seal up the slit, particularly if the pulp of the fruit or vegetable has a natural stickiness as with bananas, for example.

Handle 4 may be cast from thermoplastic material and the shafts 7 and 8 may be separate and inserted into the molds at the time of handle forming. Alternatively, shafts 7 and 8 may be the outward extensions of a single shaft passing through the handle. While shafts 7 and 8 are shown to be cylindrical, it is within the scope of the present invention for them to be flat as a straight continuation of the zig-zag portions 9 and 10. The coring assemblies preferably made of thin, springy stainless steel such as type 316. Coring rings 5 and 6 may be formed by bending a straight portion of the steel extending beyond the zig-zag portion 9 and 10 into a circle and welding the juncture of such so bent steel and the zig-zag portion. Alternatively, coring rings 5 and 6 may be formed as rings and then welded to the ends of zig-zag portion 9 and 10. It is essential that the rings be continuous with no open joints. The alternative coring shapes seen in FIG. 5 should be formed under the same guidelines at the rings.

The present invention may also be used to cut a channel in the surface of a fruit or vegetable, particularly a curved one for an appropriate filling or to make a "boat" which will hold an appropriate filling. The device may also be used to make lateral cores in sections of a cantaloupe and a honeydew melon, for example, and the cores from each inserted into the other.

The method of using the present invention for the filling of a banana with a foodstuff of paste- or gel-like consistency is as follows. The ends of the banana are sliced off, and a lengthwise strip of peeling is removed. The cutting edge of the coring assembly is inserted in one end of the banana, centering it as accurately as possible. The assembly is then drawn through the banana, following its curvature so as to maintain a centered positioning of the cutting edge with respect to the diameter of the banana. The lengthwise "plug" of banana so made is then removed by inducing it to slide out from one end. The strip of peeling previously removed is replaced and held firmly by grasping the banana in one hand, or preferably by securing with tape or rubber bands. The desired filling is inserted into one end until it begins to come out of the other end. Suitable filling devises include cake- or pastry-decorator bags or "guns," cookie-presses, or simply a plastic bag with a bottom corner cut off so as to create a hole of approximately ½" diameter. The banana is then peeled, sliced and served.

What is claimed is:

1. A device for the coring of arcuately formed fruits and vegetables and meats comprising a handle portion, a first coring assembly securedly extending at an angle from one end of said handle portion and a second coring assembly securedly extending from the opposite end of said handle portion, the angular extension of each of said coring assemblies lying in the horizontal axial plane of said handle portion, the angular extension of each of said coring assemblies being identical but reversed 180 degrees with reference to the longitudinal axis of said handle whereby one assembly is angularly disposed to one side of said handle assembly and the other of said coring assemblies is angularly disposed in the opposite direction, said first and second coring assembly each comprising a thin continuous angular coring band of stainless steel of a known geometrical form having a knife-edge thinness abutting and secured to a flat knife-like blade having a zig-zag vertical configuration portion extending outwardly from a shaft secured to each of said ends of said handle portion, said zig-zag configuration having a knife-edge thinness substantially identical to the knife-edge thinness of said angular coring band.

2. The device according to claim 1, wherein each of said shafts is an extension of a member passing through and securedly retained within said handle.

3. The device according to claim 1 wherein said member is of circular cross section, the zig-zag portion on each end thereof being a flattened portion thereof.

4. The device according to claim 1, wherein said member within said handle portion is a flat strip terminating on each end in said zig-zag portion.

5. The device according to claim 1 wherein said coring band is an integral part of said shaft extending outwardly from said zig-zag portion as a flat band that is bent into the desired geometric shape and the end of said band is welded at its juncture with said zig-zag portion to said zig-zag portion.

6. The device according to claim 1 wherein said coring band is separately formed into the desired geometric shape and then welded to the outer end of said zig-zag portion.

7. A device for the coring of arcuately formed fruits, vegetables and meats comprising a handle portion, a first coring assembly securedly extending at an angle from one end of said handle portion and a second coring assembly extending at an angle from the opposite end of said handle portion, said first and second coring assemblies each comprising a thin continuous angular band of stainless steel of a known geometrical form having a knife-edge thinness abutting and secured to a flat knife-like blade having a zig-zag vertical configuration extending outwardly from a shaft secured to each of said ends of said handle portion, said zig-zag configuration having a knife-like edge thinness substantially identical to the knife-edge thinness of said angular coring band.

* * * * *